(12) United States Patent
Koizumi

(10) Patent No.: US 9,389,399 B2
(45) Date of Patent: Jul. 12, 2016

(54) WIDE ANGLE LENS AND IMAGING APPARATUS

(71) Applicant: FUJIFILM Corporation, Tokyo (JP)

(72) Inventor: Noboru Koizumi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 17 days.

(21) Appl. No.: 14/580,740

(22) Filed: Dec. 23, 2014

(65) Prior Publication Data

US 2015/0109689 A1 Apr. 23, 2015

Related U.S. Application Data

(63) Continuation of application No. PCT/JP2013/003923, filed on Jun. 24, 2013.

(30) Foreign Application Priority Data

Jul. 5, 2012 (JP) ................. 2012-151317

(51) Int. Cl.
- *G02B 13/04* (2006.01)
- *G02B 13/06* (2006.01)
- *G02B 9/64* (2006.01)

(52) U.S. Cl.
CPC ........ *G02B 13/04* (2013.01); *G02B 9/64* (2013.01); *G02B 13/06* (2013.01)

(58) Field of Classification Search
CPC ..................................... G02B 13/04
USPC ............................................. 359/749
See application file for complete search history.

(56) References Cited

U.S. PATENT DOCUMENTS

| | | | | |
|---|---|---|---|---|
| 5,742,439 A | * | 4/1998 | Schuster | G02B 13/00 359/749 |
| 6,301,058 B2 | | 10/2001 | Nagahara | |

(Continued)

FOREIGN PATENT DOCUMENTS

| | | |
|---|---|---|
| DE | 19532111 A1 | 3/1996 |
| JP | 8-94926 | 4/1996 |

(Continued)

OTHER PUBLICATIONS

International Search Report dated Oct. 1, 2013 in corresponding International Application No. PCT/JP2013/003923.

(Continued)

*Primary Examiner* — James Jones
(74) *Attorney, Agent, or Firm* — Young & Thompson

(57) ABSTRACT

A wide angle lens includes a first lens group having negative refractive power, as a whole, a second lens group having positive refractive power, as a whole, and a third lens group having positive refractive power, as a whole, in this order from an object side. The first lens group includes a positive meniscus lens with its convex surface facing the object side and three negative meniscus lenses, each with its convex surface facing the object side, in this order from the object side. The second lens group includes at least one cemented lens. The material of at least one of the three negative meniscus lenses in the first lens group satisfies the following conditional expression (1), and the material of at least one of the other negative meniscus lenses in the first lens group satisfies the following conditional expressions (2) and (3):

$$\nu da > 81 \qquad (1);$$

$$\nu db < 25 \qquad (2); \text{ and}$$

$$\Delta\theta gFb > 0.015 \qquad (3).$$

7 Claims, 10 Drawing Sheets

EXAMPLE 1

(56) References Cited

U.S. PATENT DOCUMENTS

| | | |
|---|---|---|
| 6,894,847 B2 | 5/2005 | Suzuki |
| 7,619,833 B2 | 11/2009 | Kawakami et al. |
| 7,755,843 B2 | 7/2010 | Yamasaki |
| 2001/0012161 A1 | 8/2001 | Nagahara |
| 2004/0136095 A1 | 7/2004 | Suzuki |
| 2008/0239514 A1 | 10/2008 | Kawakami et al. |
| 2008/0304162 A1 | 12/2008 | Yamasaki |

FOREIGN PATENT DOCUMENTS

| | | |
|---|---|---|
| JP | 2000-131606 | 5/2000 |
| JP | 2001-208966 | 8/2001 |
| JP | 2004-219610 | 8/2004 |
| JP | 2006-39034 | 2/2006 |
| JP | 2008-151948 | 7/2008 |
| JP | 2008-158159 | 7/2008 |
| JP | 2008-304765 | 12/2008 |

OTHER PUBLICATIONS

German Office Action dated Jan. 27, 2016; Appln. No. 11 2013 003 384.4.

Chinese Office Action dated Mar. 2, 2016 in corresponding Chinese Patent Application No. 201380033531.4 with partial English translation of Chinese Office Action.

* cited by examiner

EXAMPLE 1

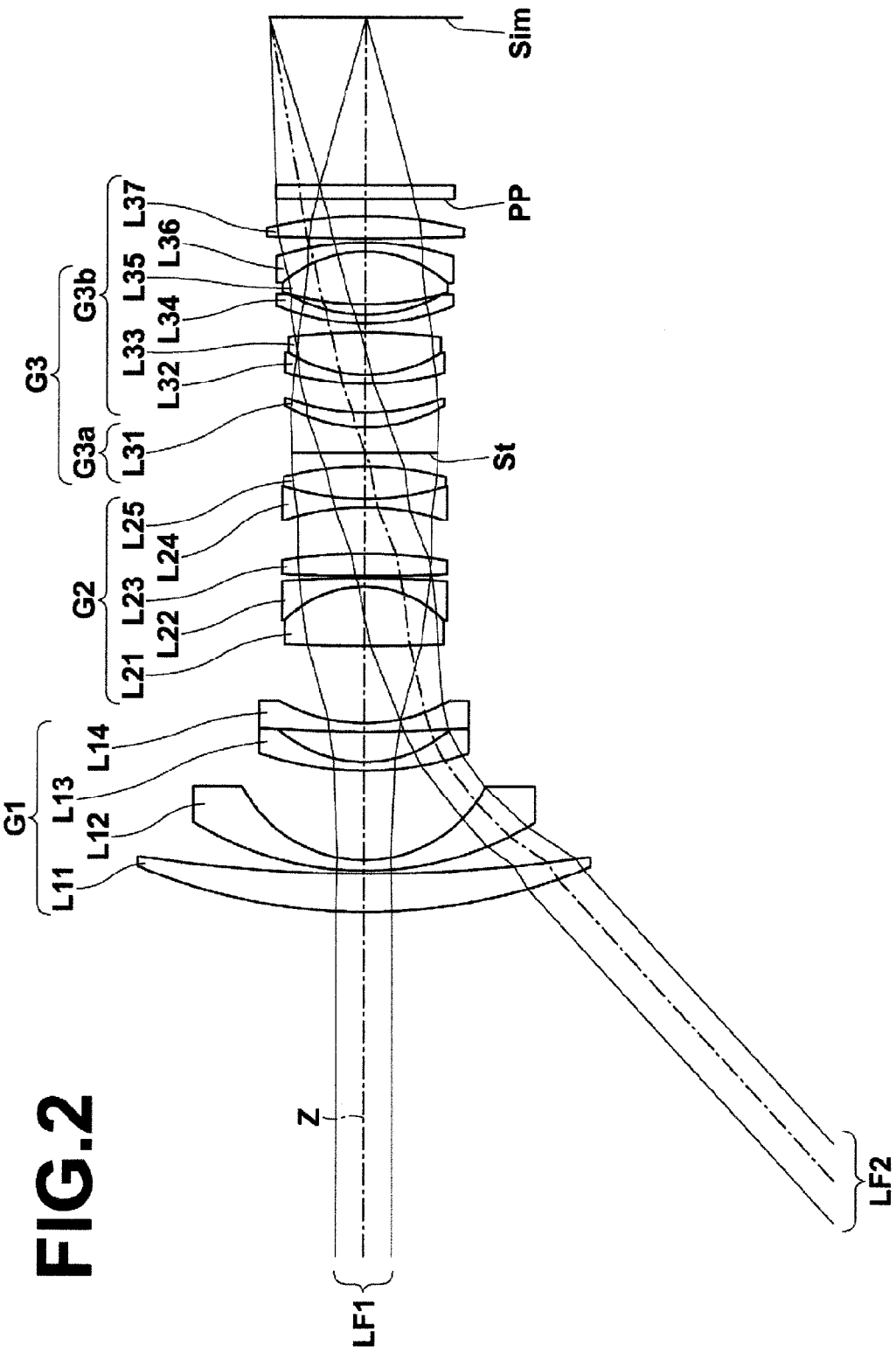
FIG.2 EXAMPLE 1

FIG.3  EXAMPLE 2
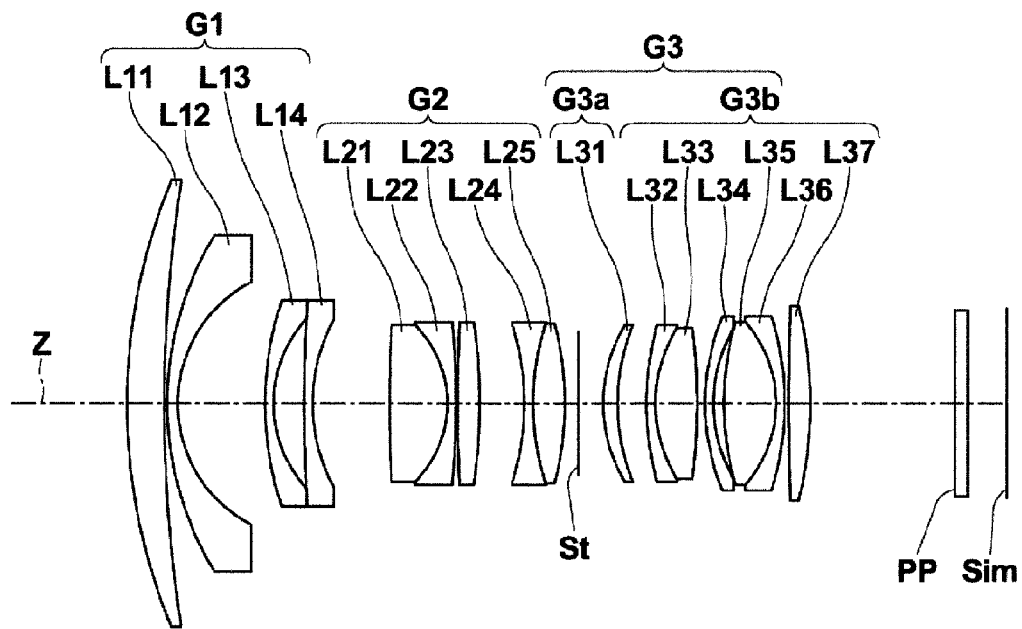
FIG.4  EXAMPLE 3
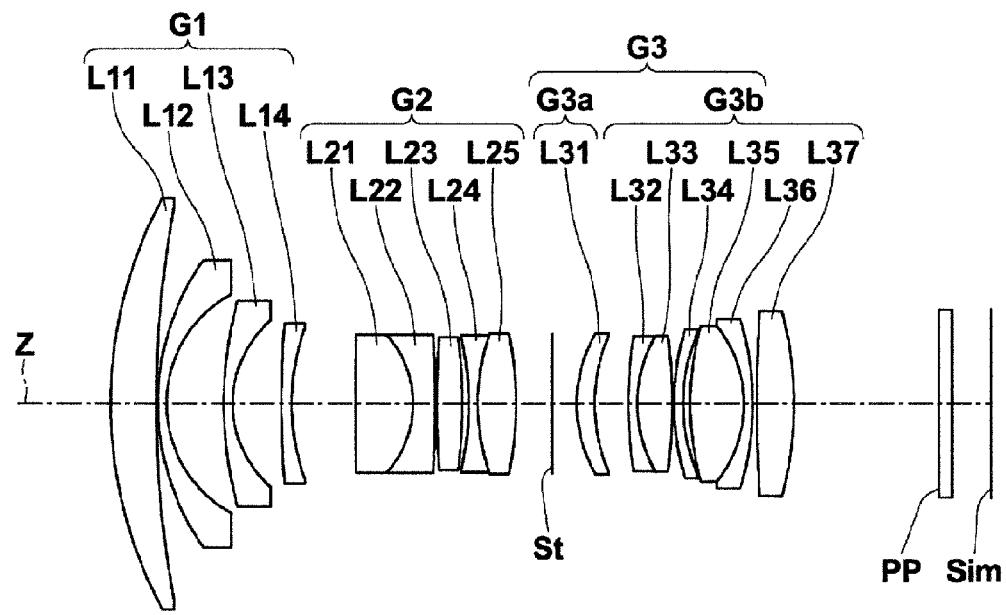

FIG.5    EXAMPLE 4
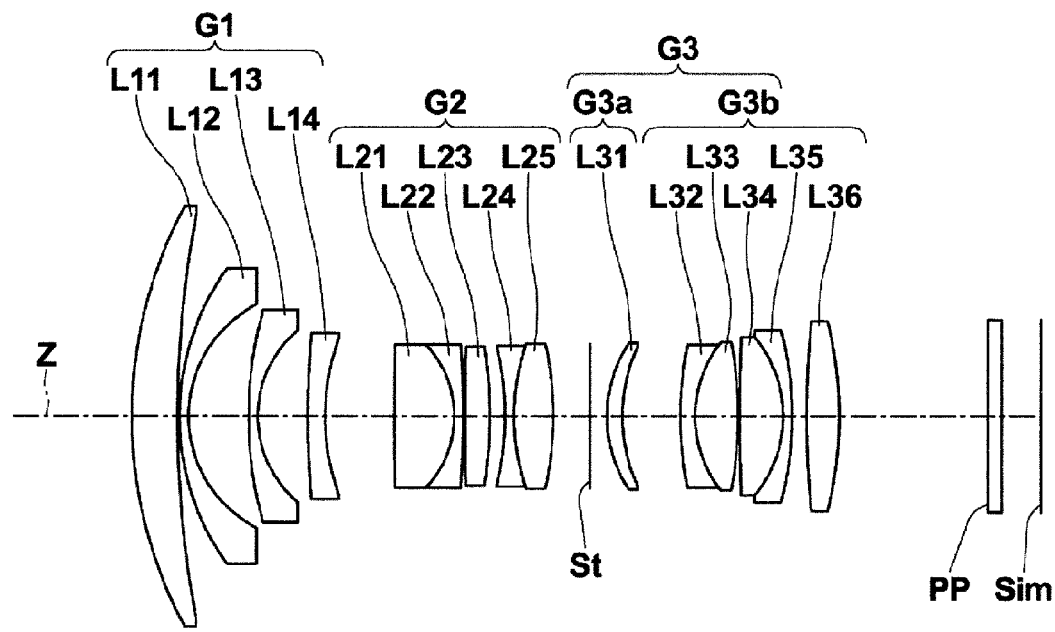
FIG.6    EXAMPLE 5
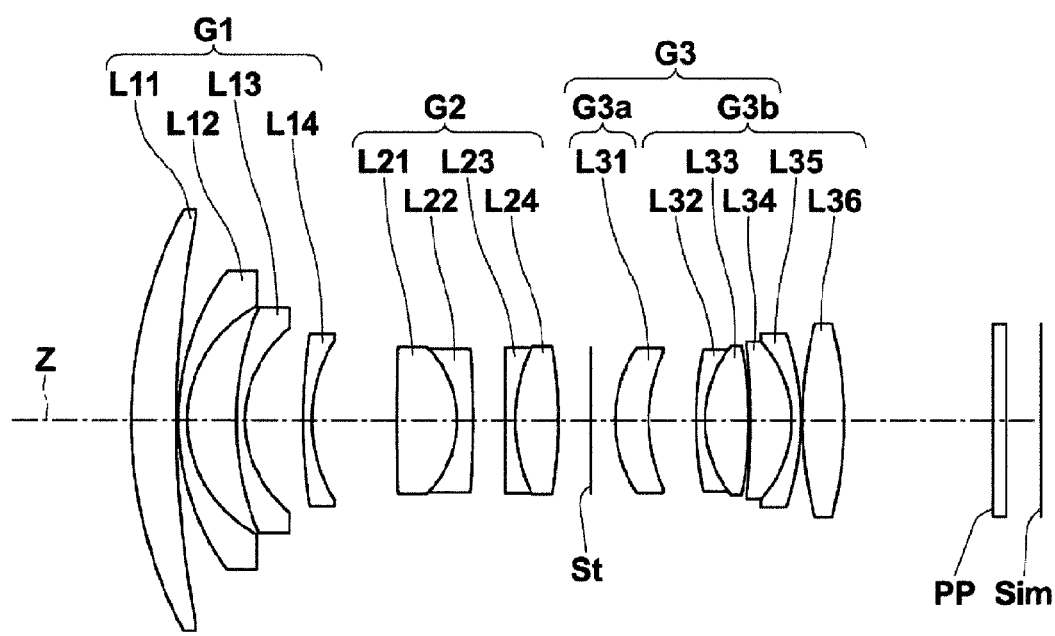

WIDE ANGLE LENS AND IMAGING APPARATUS

CROSS-REFERENCE TO RELATED APPLICATIONS

This application is a Continuation of PCT International Application No. PCT/JP2013/003923 filed on Jun. 24, 2013, which claims priority under 35 U.S.C. §119(a) to Japanese Patent Application No. 2012-151317 filed on Jul. 5, 2012. Each of the above applications is hereby expressly incorporated by reference, in its entirety, into the present application.

BACKGROUND OF THE INVENTION

1. Field of the Invention

The present invention relates to a retrofocus-type wide angle lens and an imaging apparatus. In particular, the present invention relates to a wide angle lens used in electronic cameras, such as a digital camera, a camera for broadcasting, a camera for surveillance and a camera for film making, and an imaging apparatus including the wide angle lens.

2. Description of the Related Art

As a wide angle lens used in an imaging apparatus, such as a video camera and an electronic still camera, which uses an imaging device, such as a CCD (Charge Couple Device) and a CMOS (Complementary Metal Oxide Semiconductor), as a recording medium, various retrofocus-type wide angle lenses have been proposed, for example, in Japanese Unexamined Patent Publication No. 8(1996)-094926 (Patent Document 1) and Japanese Unexamined Patent Publication No. 2004-219610 (Patent Document 2).

SUMMARY OF THE INVENTION

However, both of the lenses proposed in Patent Documents 1 and 2 have drawbacks that F-numbers are about 3.6, which means slow lenses.

In view of the aforementioned circumstances, it is an object of the present invention to provide a fast retrofocus-type wide angle lens in which various aberrations are excellently corrected, and an imaging apparatus including the lens.

A retrofocus-type wide angle lens of the present invention consists of a first lens group having negative refractive power, as a whole, a second lens group having positive refractive power, as a whole, and a third lens group having positive refractive power, as a whole, in this order from an object side. A stop is included between the second lens group and the third lens group. The first lens group consists of a positive meniscus lens with its convex surface facing the object side and three negative meniscus lenses, each with its convex surface facing the object side, in this order from the object side. The second lens group includes at least one cemented lens. The material of at least one of the three negative meniscus lenses in the first lens group satisfies the following conditional expression (1), and the material of at least one of the other negative meniscus lenses in the first lens group satisfies the following conditional expressions (2) and (3):

$$\nu da > 81 \quad (1);$$

$$\nu db < 25 \quad (2); \text{ and}$$

$$\Delta\theta gFb > 0.015 \quad (3), \text{ where}$$

νda: an Abbe number of the at least one of the three negative meniscus lenses with respect to d-line, νdb: an Abbe number of the at least one of the other negative meniscus lenses with respect to d-line, and ΔθgFb: anomalous dispersion characteristics of the at least one of the other negative meniscus lenses.

Further, it is desirable that the third lens group consists of a 3a-th lens group consisting of a positive meniscus lens with its convex surface facing the object side and a 3b-th lens group having, as a whole, positive refractive power in this order from the object side.

Further, it is desirable that the second lens group includes two cemented lenses, and that one of the two cemented lenses consists of a positive lens and a negative lens cemented together in this order from the object side, and that the other one of the two cemented lenses consists of a negative lens and a positive lens cemented together in this order from the object side. Further, it is desirable that the following conditional expressions are satisfied:

$$nd(c1p) > nd(c1n) \quad (4);$$

$$\nu d(c1p) > \nu d(c1n) \quad (5);$$

$$nd(c2n) < nd(c2p) \quad (6); \text{ and}$$

$$\nu d(c2n) > \nu d(c2p) \quad (7), \text{ where}$$

nd(c1p): a refractive index of the positive lens in the cemented lens consisting of the positive lens and the negative lens in this order from the object side for d-line, nd(c1n): a refractive index of the negative lens in the cemented lens consisting of the positive lens and the negative lens in this order from the object side for d-line, νd(c1p): an Abbe number of the positive lens in the cemented lens consisting of the positive lens and the negative lens in this order from the object side with respect to d-line, νd(c1n): an Abbe number of the negative lens in the cemented lens consisting of the positive lens and the negative lens in this order from the object side with respect to d-line, nd(c2p): a refractive index of the positive lens in the cemented lens consisting of the negative lens and the positive lens in this order from the object side for d-line, nd(c2n): a refractive index of the negative lens in the cemented lens consisting of the negative lens and the positive lens in this order from the object side for d-line, νd(c2p): an Abbe number of the positive lens in the cemented lens consisting of the negative lens and the positive lens in this order from the object side with respect to d-line, and νd(c2n): an Abbe number of the negative lens in the cemented lens consisting of the negative lens and the positive lens in this order from the object side with respect to d-line.

Further, it is desirable that the third lens group includes two cemented lenses, each including a convex lens, and all of the convex lenses included in the cemented lenses in the third lens group satisfy the following conditional expression:

$$\nu dc > 81 \quad (8), \text{ where}$$

νdc: an Abbe number of each of all the convex lenses included in the cemented lenses in the third lens group with respect to d-line.

Further, it is desirable that focusing is performed by moving the 3b-th lens group in the direction of an optical axis.

Further, it is desirable that the following conditional expression is satisfied:

$$\Delta\theta gFb > 0.025 \quad (3a).$$

An imaging apparatus of the present invention includes the aforementioned wide angle lens of the present invention.

A retrofocus-type wide angle lens of the present invention consists of a first lens group having negative refractive power, as a whole, a second lens group having positive refractive power, as a whole, and a third lens group having positive refractive power, as a whole, in this order from an object side. Further, the first lens group consists of a positive meniscus lens with its convex surface facing the object side and three negative meniscus lenses, each with its convex surface facing the object side, in this order from the object side. The second lens group includes at least one cemented lens. The material of at least one of the three negative meniscus lenses in the first lens group satisfies the following conditional expression (1), and the material of at least one of the other negative meniscus lenses in the first lens group satisfies the following conditional expressions (2) and (3). Therefore, it is possible to excellently correct a lateral chromatic aberration while the lens has an F-number of about 1.9, which means a fast lens, and a wide angle of view of about 85 degrees.

$$\nu da > 81 \quad (1);$$

$$\nu db < 25 \quad (2); \text{ and}$$

$$\Delta \theta gFb > 0.015 \quad (3).$$

Further, the imaging apparatus of the present invention includes the wide angle lens of the present invention. Therefore, bright high-quality video images are obtainable.

BRIEF DESCRIPTION OF THE DRAWINGS

FIG. 2 is a diagram illustrating optical paths of the wide angle lens;

FIG. 3 is a cross section illustrating the lens structure of a wide angle lens in Example 2 of the present invention;

FIG. 4 is a cross section illustrating the lens structure of a wide angle lens in Example 3 of the present invention;

FIG. 5 is a cross section illustrating the lens structure of a wide angle lens in Example 4 of the present invention;

FIG. 6 is a cross section illustrating the lens structure of a wide angle lens in Example 5 of the present invention;

DESCRIPTION OF THE PREFERRED EMBODIMENTS

Figure 1:
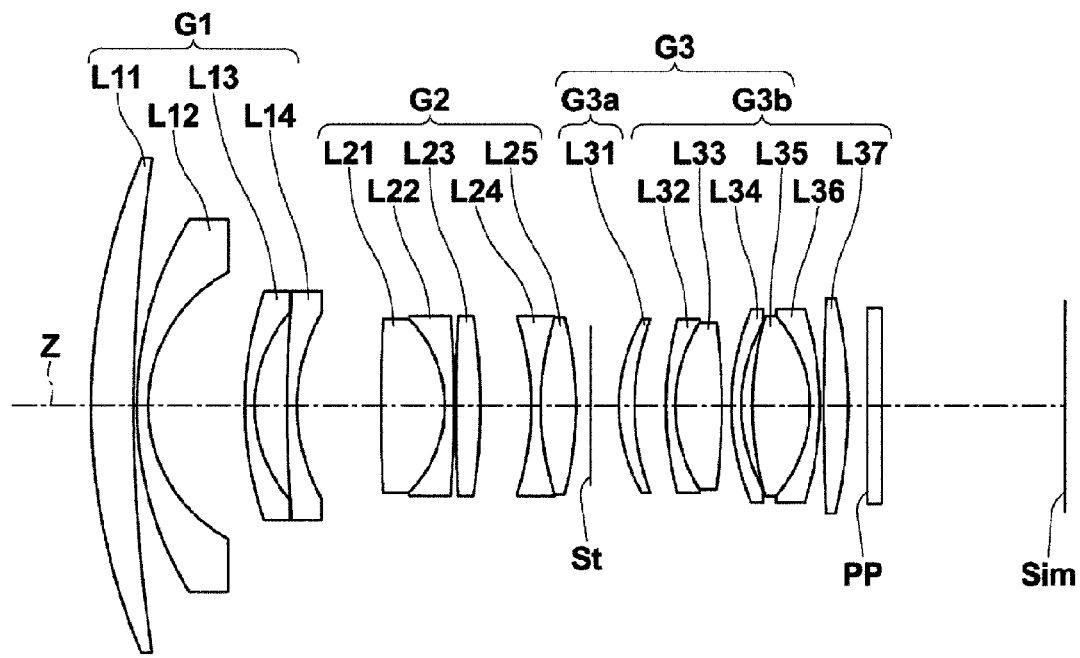
FIG. 1 is a cross section illustrating the lens structure of a wide angle lens according to an embodiment of the present invention (also Example 1)

Hereinafter, embodiments of the present invention will be described in detail with reference to drawings. FIG. 1 is a cross section illustrating the lens structure of a wide angle lens according to an embodiment of the present invention (also Example 1).

FIG. 2 is a diagram illustrating optical paths of the wide angle lens. The example of structure illustrated in FIG. 1 and FIG. 2 is also the structure of a wide angle lens in Example 1, which will be described later. In FIG. 1 and FIG. 2, the left side is an object side, and the right side is an image side. In FIG. 2, axial rays LF1 from an object point at infinite distance and off-axial rays LF2 at angle ω of view are also illustrated.

This wide angle lens consists of first lens group G1 having negative refractive power, as a whole, second lens group G2 having positive refractive power, as a whole, aperture stop St, and third lens group G3 having positive refractive power, as a whole, along optical axis Z in this order from the object side. Here, aperture stop St illustrated in FIG. 1 and FIG. 2 does not necessarily represent the size nor the shape of aperture stop, but a position on optical axis Z.

When this wide angle lens is applied to an imaging apparatus, it is desirable to arrange a cover glass, a prism, and various filters, such as an infrared ray cut filter and a low-pass filter, between an optical system and image plane Sim based on the structure of a camera on which the lens is mounted. Therefore, FIG. 1 illustrates an example in which parallel-flat-plate-shaped optical member PP, which is assumed to be such elements, is arranged between third lens group G3 and image plane Sim.

First lens group G1 consists of positive meniscus lens L11 with its convex surface facing the object side and three negative meniscus lenses L12, L13 and L14, each with its convex surface facing the object side, in this order from the object side. The wide angle lens is structured in such a manner that the material of at least one of three negative meniscus lenses L12, L13 and L14 satisfies the following conditional expression (1), and that the material of at least one of the other negative meniscus lenses in first lens group G1 satisfies the following conditional expressions (2) and (3).

$$\nu da > 81 \quad (1);$$

$$\nu db < 25 \quad (2); \text{ and}$$

$$\Delta \theta gFb > 0.015 \quad (3), \text{ where}$$

νda: an Abbe number of the at least one of the three negative meniscus lenses with respect to d-line, νdb: an Abbe number of the at least one of the other negative meniscus lenses with respect to d-line, and ΔθgFb: anomalous dispersion characteristics of the at least one of the other negative meniscus lenses.

Next, ΔθgF will be described in detail. When equation (A) represents a partial dispersion ratio for g-line and F-line, and equation (B) represents a partial dispersion ratio of a normal glass having the same refractive index n as that of the lens in equation (A) and Abbe number vd, ΔθgF is represented by equation (C):

$$\theta gF = (ng - nF)/(nF - nC) \quad (A);$$

$$\theta gF(n) = -0.0016 \cdot \nu d + 0.6415 \quad (B); \text{ and}$$

$$\Delta \theta gF = \theta gF - \theta gF(n) \quad (C).$$

Here, when conditional expression (1) is satisfied, it is possible to reduce the absolute value of a lateral chromatic aberration.

Further, when conditional expressions (2) and (3) are satisfied, it is possible to reduce a second-order lateral chromatic aberration. Here, when the following conditional expression (3a) is satisfied, more excellent characteristics are achievable.

$$\Delta \theta gFb > 0.025 \quad (3a).$$

When first lens group G1 is structured as described above, it is possible to excellently correct a lateral chromatic aberration of the entire lens system when first lens group G1 is combined into the entire lens system.

Further, second lens group G2 includes at least one cemented lens.

The size of a retrofocus-type wide angle lens is reducible by using a positive meniscus lens, as a first lens from the object side, and a negative meniscus lens, as a second lens from the object side. Therefore, the wide angle lens of the present invention achieves a reduction in size by structuring in such a manner.

When the structure as described above is adopted, it is possible to excellently correct a lateral chromatic aberration while the lens has an F-number of about 1.9, which means a fast lens, and a wide angle of view of about 85 degrees.

It is desirable that third lens group G3 consists of 3a-th lens group G3a consisting of positive meniscus lens L31 with its convex surface facing the object side and 3b-th lens group G3b having, as a whole, positive refractive power in this order from the object side.

In a first lens group of a retrofocus-type wide angle lens, dispersion action is generally strong. Therefore, a spherical aberration tends to be over-corrected. Especially, when the lens has a small F-number, which means a fast lens, this tendency is strong. Further, also in the third lens group of the lens having a small F-number, which means a fast lens, the dispersion action of a negative lens for correcting a longitudinal chromatic aberration is strong. Therefore, a spherical aberration tends to be over-corrected. Hence, it is possible to excellently correct a spherical aberration of the entire system by generating an under-correction-side spherical aberration by arranging positive meniscus lens L31 with its convex surface facing the object side most toward the object side in third lens group G3, as described above.

It is desirable that second lens group G2 includes two cemented lenses, and that one of the two cemented lenses consists of a positive lens and a negative lens cemented together in this order from the object side, and the other one of the two cemented lenses consists of a negative lens and a positive lens cemented together in this order from the object side. Further, it is desirable that the following conditional expressions (4) through (7) are satisfied. When conditional expression (4) is satisfied, it is possible to reduce a longitudinal chromatic aberration. When conditional expression (5) is satisfied, it is possible to reduce a lateral chromatic aberration. Further, when conditional expressions (6) and (7) are satisfied, it is possible to reduce the longitudinal chromatic aberration while maintaining an excellent spherical aberration. Therefore, it is possible to excellently correct the longitudinal chromatic aberration and the lateral chromatic aberration in the retrofocus-type wide angle lens with a small F-number.

$$nd(c1p) > nd(c1n) \quad (4);$$

$$vd(c1p) > vd(c1n) \quad (5);$$

$$nd(c2n) < nd(c2p) \quad (6); \text{ and}$$

$$vd(c2n) > vd(c2p) \quad (7), \text{ where}$$

nd(c1p): a refractive index of the positive lens in the cemented lens consisting of the positive lens and the negative lens in this order from the object side for d-line, nd(c1n): a refractive index of the negative lens in the cemented lens consisting of the positive lens and the negative lens in this order from the object side for d-line, vd(c1p): an Abbe number of the positive lens in the cemented lens consisting of the positive lens and the negative lens in this order from the object side with respect to d-line, vd(c1n): an Abbe number of the negative lens in the cemented lens consisting of the positive lens and the negative lens in this order from the object side with respect to d-line, nd(c2p): a refractive index of the positive lens in the cemented lens consisting of the negative lens and the positive lens in this order from the object side for d-line, nd(c2n): a refractive index of the negative lens in the cemented lens consisting of the negative lens and the positive lens in this order from the object side for d-line, vd(c2p): an Abbe number of the positive lens in the cemented lens consisting of the negative lens and the positive lens in this order from the object side with respect to d-line, and vd(c2n): an Abbe number of the negative lens in the cemented lens consisting of the negative lens and the positive lens in this order from the object side with respect to d-line.

It is desirable that third lens group G3 includes two cemented lenses, each including a convex lens, and all of the convex lenses included in the cemented lenses in the third lens group satisfy the following conditional expression (8). Accordingly, it is possible to excellently correct a longitudinal chromatic aberration and a lateral chromatic aberration. Meanwhile, material with an Abbe number of greater than 81 with respect to d-line has characteristics that its refractive index becomes lower as temperature rises. Therefore, when such material is used as the material of a convex lens, if the temperature of environment in which the lens is used rises, a focus position becomes farther, and if the temperature of environment in which the lens is used drops, a focus position becomes closer. In the wide angle lens of the present invention, material with an Abbe number of greater than 81 with respect to d-line is used as the material of at least one of the negative meniscus lenses in first lens group G1. Therefore, that contributes not only to correcting chromatic aberrations but also to easing the movement of the focus positions of the convex lenses in third lens group G3 caused by a change in temperature.

$$vdc > 81 \quad (8), \text{ where}$$

vdc: an Abbe number of each of all the convex lenses included in the cemented lenses in the third lens group with respect to d-line.

Further, when aperture stop St is included between second lens group G2 and third lens group G3, it is possible to balance the effective diameter of a lens most toward the object side and the effective diameter of a lens most toward the image side. Therefore, it is possible to reduce the size of the entire lens system.

In this wide angle lens, focus may be adjusted by using a rear focus method. Specifically, third lens 3G is divided at a position with a longest distance between lenses, as a border, into 3a-th lens group G3a, which is arranged toward the aperture stop St side of the border, and 3b-th lens group G3b, which is arranged toward the image side of the border, and 3a-th lens group G3a consists of positive meniscus lens L31. Focusing is possible by moving only 3b-th lens group G3b on the optical axis. When the lens system is structured in this manner, it is possible to reduce the weight of the group that is moved during focusing, compared with a case in which the whole third lens group G3 is moved. Therefore, it is possible to suppress fluctuations of aberrations due to focusing.

In the wide angle lens of the present invention, it is desirable to use glass as a specific material arranged most toward the object side. Alternatively, transparent ceramic may be used.

When the wide angle lens of the present invention is used in tough environments, it is desirable that a multilayer coating for protection is applied. Further, an anti-reflection coating for reducing ghost light or the like during usage may be applied besides the coating for protection.

FIG. 1 and FIG. 2 illustrate an example in which optical member PP is arranged between the lens system and image plane Sim. Instead of arranging there various filters, such as a low-pass filter and a filter that cuts a specific wavelength band, the various filters may be arranged between lenses. Alternatively, a coating having a similar action to that of the various filters may be applied to a lens surface of one of the lenses.

Next, numerical value examples of the wide angle lens of the present invention will be described. Numerical values in the following tables 1 through 11 and aberration diagrams illustrated in FIGS. 7 through 11 are normalized so that the focal length of the entire system when the lens system is focused on an object at infinity is 1.0.

First, a wide angle lens in Example 1 will be described. FIG. 1 is a cross section illustrating the lens structure of the wide angle lens in Example 1. Optical member PP is also illustrated in FIG. 1 and FIGS. 3 through 6 corresponding to Examples 2 through 5, which will be described later. Further, the left side is the object side, and the right side is the image side. Illustrated aperture stop St does not necessarily represent the size nor the shape of aperture stop, but a position on optical axis Z.

The wide angle lens in Example 1 consists of first lens group G1 having negative refractive power as a whole, second lens group G2 having positive refractive power as a whole, and third lens group G3 having positive refractive power as a whole in this order from the object side.

First lens group G1 consists of positive meniscus lens L11 with its convex surface facing the object side and three negative meniscus lenses L12, L13 and L14, each with its convex surface facing the object side, in this order from the object side.

Second lens group G2 consists of a cemented lens consisting of biconvex lens L21 and negative meniscus lens L22, and the cemented surface of which is convex toward the image side, biconvex lens L23, and a cemented lens consisting of biconcave lens L24 and biconvex lens L25, and the cemented surface of which is convex toward the object side, in this order from the object side.

Third lens group G3 consists of 3a-th lens group G3a consisting of positive meniscus lens L31 with its convex surface facing the object side, and which is arranged most toward the object side, and 3b-th lens group G3b. 3b-th lens group G3b consists of a cemented lens consisting of negative meniscus lens L32 and biconvex lens L33, and the cemented surface of which is convex toward the object side, negative meniscus lens L34 with its concave surface facing the image side, and a cemented lens consisting of biconvex lens L35 and negative meniscus lens L36, and the cemented surface of which is convex toward the image side, and biconvex lens L37 in this order from the object side.

Table 1 shows basic lens data of the wide angle lens in Example 1, and Table 2 shows data about specification of the wide angle lens in Example 1.

Next, the meanings of signs in the tables will be described by using Example 1 as an example. The meanings of signs in Examples 2 through 5 are basically similar to Example 1.

In the lens data of Table 1, a column of Si shows the surface number of i-th surface (i=1, 2, 3 . . . ) that sequentially increases toward the image side when a most object-side surface of composition elements is the first surface. A column of Ri shows the curvature radius of the i-th surface, and a column of Di shows a surface distance on optical axis Z between an i-th surface and an (i+1)th surface. Further, a column of Ndj shows a refractive index for d-line (wavelength is 587.6 nm) of a medium between the i-th surface and the (i+1)th surface. A column of vdj shows an Abbe number of a j-th optical element (j=1, 2, 3 . . . ) with respect to d-line when a most object-side optical element is the first optical element and j sequentially increases toward the image side. A column of $\Delta\theta gFj$ shows anomalous dispersion characteristics of the j-th optical element (j=1, 2, 3 . . . ) when the most object-side optical element is the first optical element and j sequentially increases toward the image side.

Here, the sign of a curvature radius is positive when a surface shape is convex toward the object side, and negative when a surface shape is convex toward the image side. The basic lens data show also aperture stop St and optical member PP. In the column of surface numbers, the term "(STOP)" is written together with the surface number of a surface corresponding to aperture stop St.

Data about specification in Table 2 show focal length f', backfocus Bf', F-number Fno., and full angle 2w of view.

In the basic lens data and the data about specification, degrees are used as the unit of angles. However, no unit is present for the other values because the values are normalized.

TABLE 1

EXAMPLE 1·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | $\Delta\theta gFj$ (ANOMALOUS DISPERSION CHARACTERISTICS) |
|---|---|---|---|---|---|
| 1 | 5.542847 | 0.3612 | 1.77250 | 49.60 | |
| 2 | 14.098487 | 0.0278 | | | |
| 3 | 3.071206 | 0.1000 | 1.61800 | 63.33 | 0.0051 |
| 4 | 1.301834 | 0.8447 | | | |
| 5 | 3.061957 | 0.0834 | 1.80809 | 22.76 | 0.0261 |
| 6 | 1.221411 | 0.2845 | | | |
| 7 | 12.970118 | 0.0834 | 1.49700 | 81.54 | 0.0280 |
| 8 | 1.644818 | 0.7280 | | | |
| 9 | 16.630086 | 0.5563 | 1.80610 | 40.92 | |
| 10 | −1.056614 | 0.0828 | 1.71736 | 29.52 | |
| 11 | −9.734791 | 0.0167 | | | |

TABLE 1-continued

EXAMPLE 1·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 12 | 19.045622 | 0.2112 | 1.84661 | 23.78 | |
| 13 | −5.074320 | 0.4357 | | | |
| 14 | −2.492015 | 0.0840 | 1.83481 | 42.73 | |
| 15 | 2.492015 | 0.3051 | 1.84139 | 24.56 | |
| 16 | −2.981717 | 0.1306 | | | |
| 17 (STOP) | ∞ | 0.2417 | | | |
| 18 | 1.486442 | 0.1389 | 1.51633 | 64.14 | |
| 19 | 2.112515 | 0.2734 | | | |
| 20 | 2.829996 | 0.0840 | 1.80518 | 25.42 | |
| 21 | 1.359432 | 0.3996 | 1.49700 | 81.54 | |
| 22 | −5.901987 | 0.0834 | | | |
| 23 | 2.146761 | 0.0834 | 1.80518 | 25.42 | |
| 24 | 1.443430 | 0.0995 | | | |
| 25 | 2.797351 | 0.5002 | 1.49700 | 81.54 | |
| 26 | −1.165593 | 0.0834 | 1.80518 | 25.42 | |
| 27 | −2.759720 | 0.0378 | | | |
| 28 | 24.625244 | 0.2112 | 1.72342 | 37.95 | |
| 29 | −3.935789 | 0.1667 | | | |
| 30 | ∞ | 0.1278 | 1.51680 | 64.20 | |
| 31 | ∞ | 1.5928 | | | |

TABLE 2

EXAMPLE 1·SPECIFICATION (d-LINE)

| f | 1.00 |
|---|---|
| Bf | 1.84 |
| Fno. | 1.90 |
| 2ω [°] | 85.0 |

Figure 7:
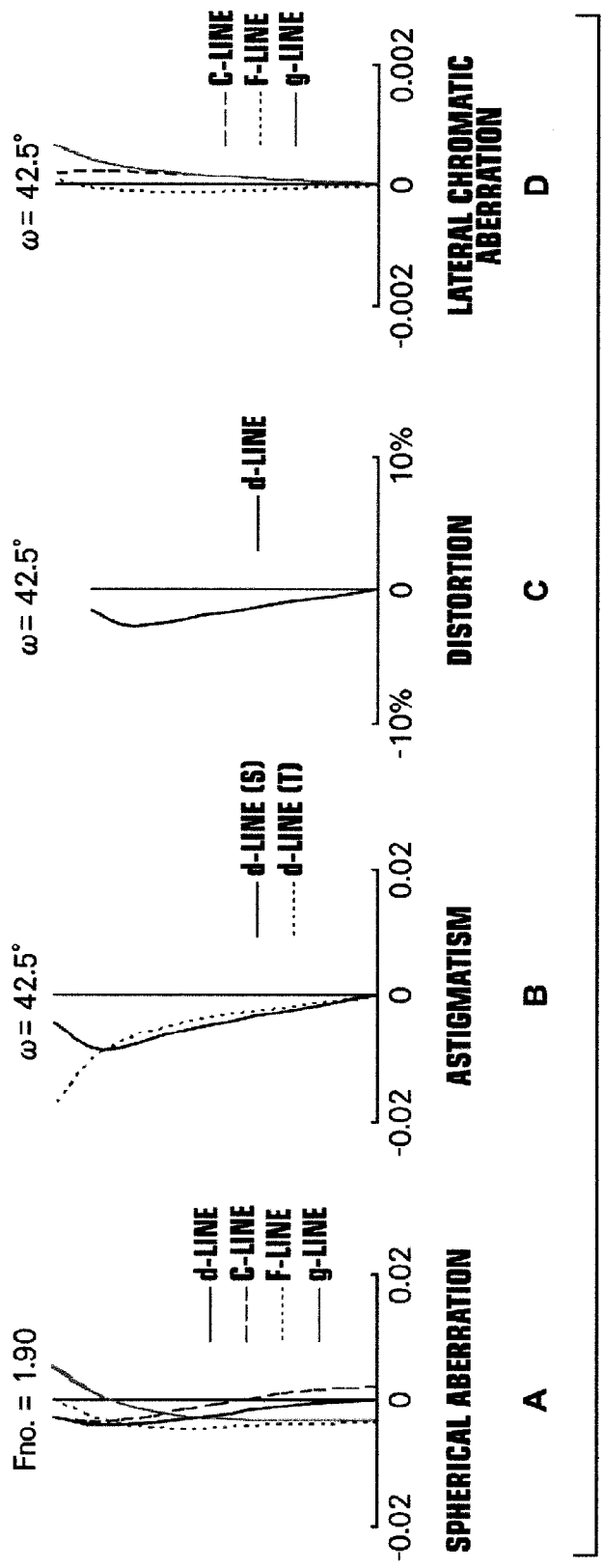
FIG. 7 is a diagram illustrating aberrations of the wide angle lens in Example 1 of the present invention Sections A through D.

FIG. 7, Sections A through D are aberration diagrams of the wide angle lens in Example 1. FIG. 7, Sections A through D illustrate a spherical aberration, astigmatism, distortion and a lateral chromatic aberration, respectively. Next, the meanings of the aberration diagrams will be described by using the aberration diagrams in Example 1, as an example. The meanings of aberration diagrams in Examples 2 through 5 are basically similar to Example 1.

The aberration diagrams of a spherical aberration, astigmatism and distortion illustrate aberrations when d-line (wavelength is 587.6 nm) is a reference wavelength. The aberration diagram of the spherical aberration illustrates aberrations for d-line (wavelength is 587.6 nm), C-line (wavelength is 656.3 nm), F-line (wavelength is 486.1 nm) and g-line (wavelength is 435.8 nm) by a solid line, a long broken line, a short broken line and a dotted line, respectively. The aberration diagram of the astigmatism illustrates aberrations for a sagittal direction and a tangential direction by a solid line and a broken line, respectively. The aberration diagram of the lateral chromatic aberration illustrates aberrations for C-line (wavelength is 656.3 nm), F-line (wavelength is 486.1 nm) and g-line (wavelength is 435.8 nm) by a long broken line, a short broken line and a dotted line, respectively. In the aberration diagram of the spherical aberration, Fno. means an F-number. In the other diagrams, ω represents a half angle of view.

Next, a wide angle lens in Example 2 will be described. FIG. 3 is a cross section illustrating the lens structure of the wide angle lens in Example 2. The lens structure of this example is similar to that of Example 1.

Figure 8:
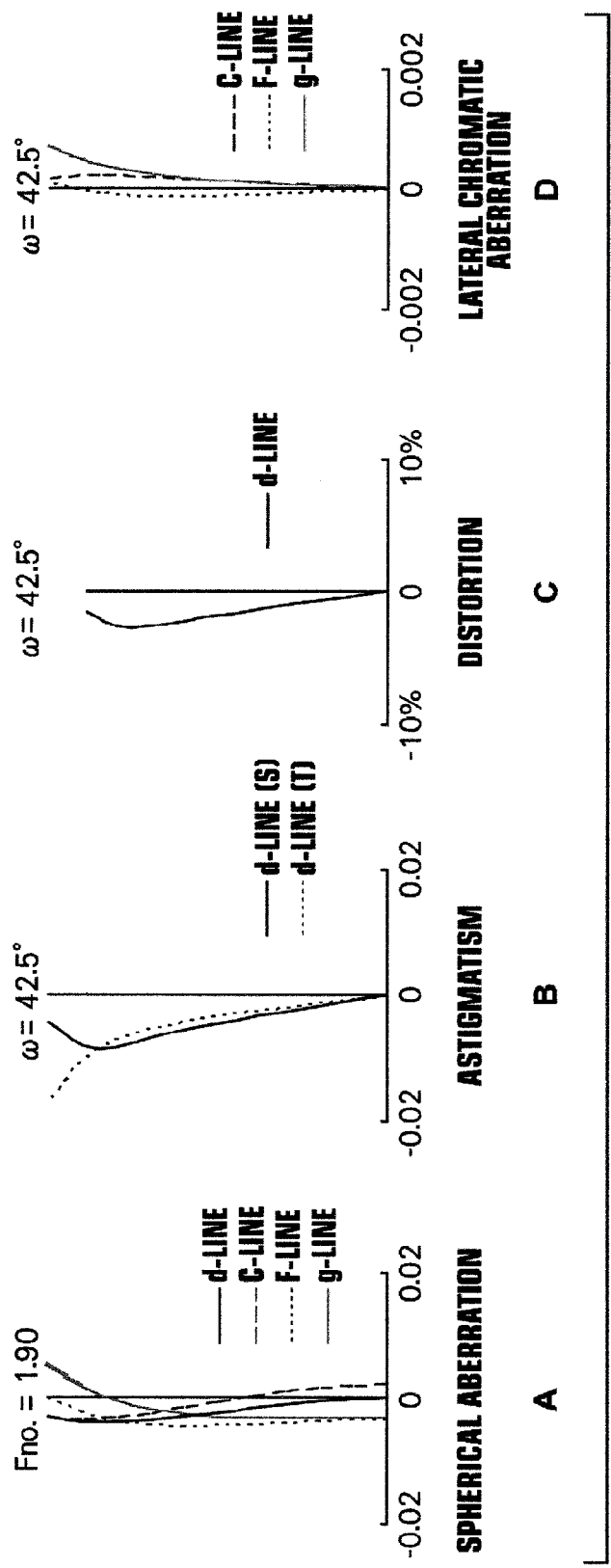
FIG. 8 is a diagram illustrating aberrations of the wide angle lens in Example 2 of the present invention Sections A through D.

Table 3 shows basic lens data of the wide angle lens in Example 2, and Table 4 shows data about specification of the wide angle lens in Example 2. FIG. 8, Sections A through D are aberration diagrams of the wide angle lens in Example 2.

TABLE 3

EXAMPLE 2·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 1 | 5.556584 | 0.3611 | 1.77250 | 49.60 | |
| 2 | 14.140638 | 0.0278 | | | |
| 3 | 3.052426 | 0.1000 | 1.61800 | 63.33 | 0.0051 |
| 4 | 1.301315 | 0.8444 | | | |
| 5 | 3.095693 | 0.0833 | 1.80809 | 22.76 | 0.0261 |
| 6 | 1.218814 | 0.2866 | | | |
| 7 | 13.671105 | 0.0833 | 1.49700 | 81.54 | 0.0280 |
| 8 | 1.678148 | 0.7411 | | | |
| 9 | 18.360770 | 0.5555 | 1.80610 | 40.92 | |
| 10 | −1.059748 | 0.0833 | 1.71736 | 29.52 | |
| 11 | −8.377437 | 0.0167 | | | |
| 12 | 16.673103 | 0.2111 | 1.84661 | 23.78 | |
| 13 | −5.345223 | 0.4244 | | | |
| 14 | −2.508076 | 0.0833 | 1.83481 | 42.73 | |

TABLE 3-continued

EXAMPLE 2·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | ΔθgFj (ANOMALOUS DISPERSION CHARACTERISTICS) |
|---|---|---|---|---|---|
| 15 | 2.508076 | 0.3055 | 1.84139 | 24.56 | |
| 16 | −3.005263 | 0.1305 | | | |
| 17 (STOP) | ∞ | 0.2411 | | | |
| 18 | 1.462289 | 0.1389 | 1.51633 | 64.14 | |
| 19 | 2.029938 | 0.2795 | | | |
| 20 | 2.872447 | 0.0833 | 1.80518 | 25.42 | |
| 21 | 1.345336 | 0.4000 | 1.49700 | 81.54 | |
| 22 | −5.805069 | 0.0744 | | | |
| 23 | 2.145907 | 0.0833 | 1.80518 | 25.42 | |
| 24 | 1.454239 | 0.0989 | | | |
| 25 | 2.828805 | 0.5000 | 1.49700 | 81.54 | |
| 26 | −1.167795 | 0.0833 | 1.80518 | 25.42 | |
| 27 | −2.751227 | 0.0378 | | | |
| 28 | 27.543948 | 0.2111 | 1.72342 | 37.95 | |
| 29 | −3.858300 | 1.3888 | | | |
| 30 | ∞ | 0.1278 | 1.51680 | 64.20 | |
| 31 | ∞ | 0.3709 | | | |

TABLE 4

EXAMPLE 2·SPECIFICATION (d-LINE)

| | |
|---|---|
| f | 1.00 |
| Bf | 1.84 |
| Fno. | 1.89 |
| 2ω [°] | 85.0 |

Next, a wide angle lens in Example 3 will be described. FIG. 4 is a cross section illustrating the lens structure of the wide angle lens in Example 3. The lens structure of this example is similar to that of Example 1.

Figure 9:
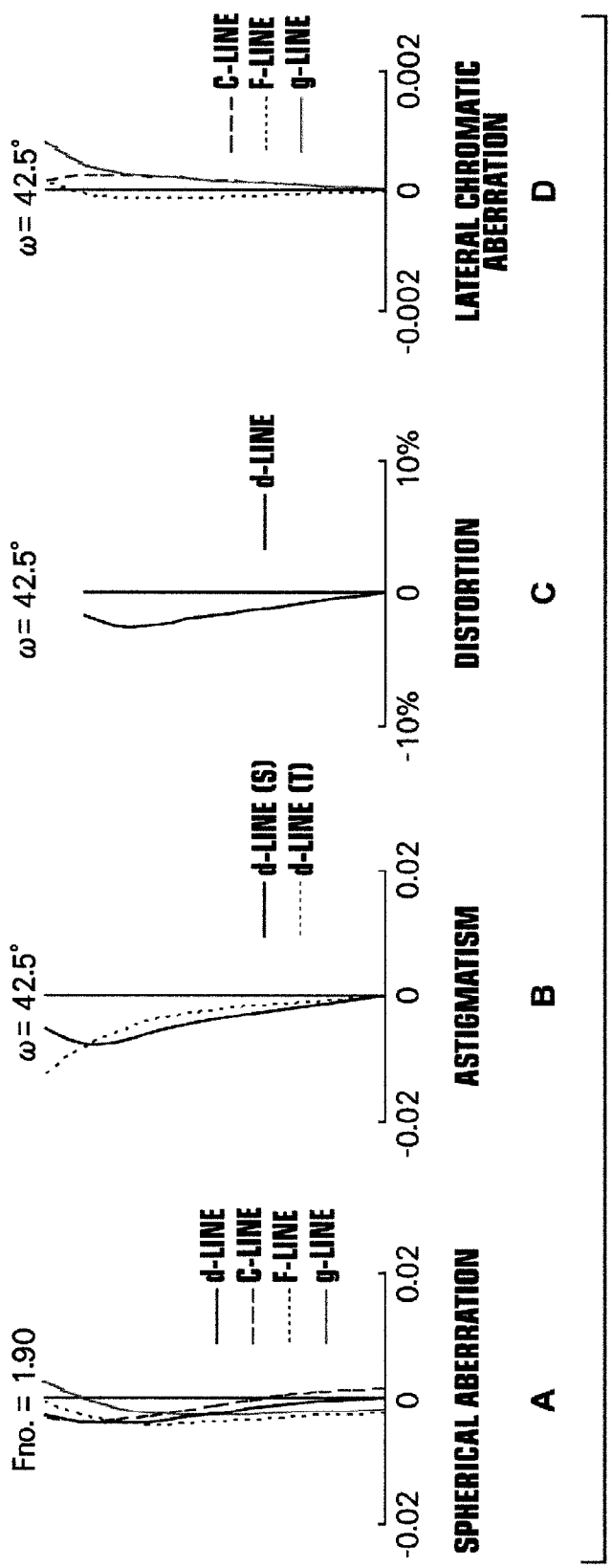
FIG. 9 is a diagram illustrating aberrations of the wide angle lens in Example 3 of the present invention Sections A through D.

Table 5 shows basic lens data of the wide angle lens in Example 3, and Table 6 shows data about specification of the wide angle lens in Example 3. FIG. 9, Sections A through D are aberration diagrams of the wide angle lens in Example 3.

TABLE 5

EXAMPLE 3·LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | ΔθgFj (ANOMALOUS DISPERSION CHARACTERISTICS) |
|---|---|---|---|---|---|
| 1 | 4.138694 | 0.4391 | 1.77250 | 49.60 | |
| 2 | 10.378872 | 0.0167 | | | |
| 3 | 2.370282 | 0.0834 | 1.61800 | 63.33 | 0.0051 |
| 4 | 1.195041 | 0.5558 | | | |
| 5 | 3.779666 | 0.0834 | 1.80809 | 22.76 | 0.0261 |
| 6 | 1.056083 | 0.4675 | | | |
| 7 | 9.831900 | 0.0945 | 1.49700 | 81.54 | 0.0280 |
| 8 | 2.093741 | 0.6148 | | | |
| 9 | 27.791658 | 0.5558 | 1.80610 | 40.92 | |
| 10 | −0.995985 | 0.2112 | 1.71736 | 29.52 | |
| 11 | −11.978471 | 0.0167 | | | |
| 12 | 9.186432 | 0.2446 | 1.84661 | 23.78 | |
| 13 | −4.986438 | 0.0610 | | | |
| 14 | −2.779166 | 0.0834 | 1.83481 | 42.73 | |
| 15 | 2.064869 | 0.3668 | 1.84139 | 24.56 | |
| 16 | −3.277541 | 0.3474 | | | |
| 17 (STOP) | ∞ | 0.2373 | | | |
| 18 | 1.348934 | 0.1723 | 1.51633 | 64.14 | |
| 19 | 1.667499 | 0.3263 | | | |
| 20 | 4.166249 | 0.0834 | 1.80518 | 25.42 | |
| 21 | 1.308194 | 0.3391 | 1.49700 | 81.54 | |
| 22 | −4.948323 | 0.0167 | | | |
| 23 | 2.586251 | 0.0834 | 1.80518 | 25.42 | |
| 24 | 1.772978 | 0.0667 | | | |
| 25 | 2.783511 | 0.5169 | 1.49700 | 81.54 | |
| 26 | −1.199272 | 0.0834 | 1.80518 | 25.42 | |
| 27 | −2.830583 | 0.0395 | | | |
| 28 | 12.978024 | 0.3613 | 1.72342 | 37.95 | |
| 29 | −3.472502 | 1.3896 | | | |
| 30 | ∞ | 0.1278 | 1.51680 | 64.20 | |
| 31 | ∞ | 0.3756 | | | |

TABLE 6

| EXAMPLE 3•SPECIFICATION (d-LINE) | |
| --- | --- |
| f' | 1.00 |
| Bf' | 1.85 |
| Fno. | 1.90 |
| 2ω [°] | 85.0 |

Next, a wide angle lens in Example 4 will be described. FIG. 5 is a cross section illustrating the lens structure of the wide angle lens in Example 4.

The structure of the wide angle lens in Example 4 is similar to that of Example 1 except that third lens group G3 does not include the negative meniscus lens with its concave surface facing the image side (negative meniscus lens L34 in Example 1). The absolute value of the curvature radius of each of the cemented surfaces of the two cemented lenses in third lens group G3 is reduced to compensate for the effect of the negative meniscus lens.

Figure 10:
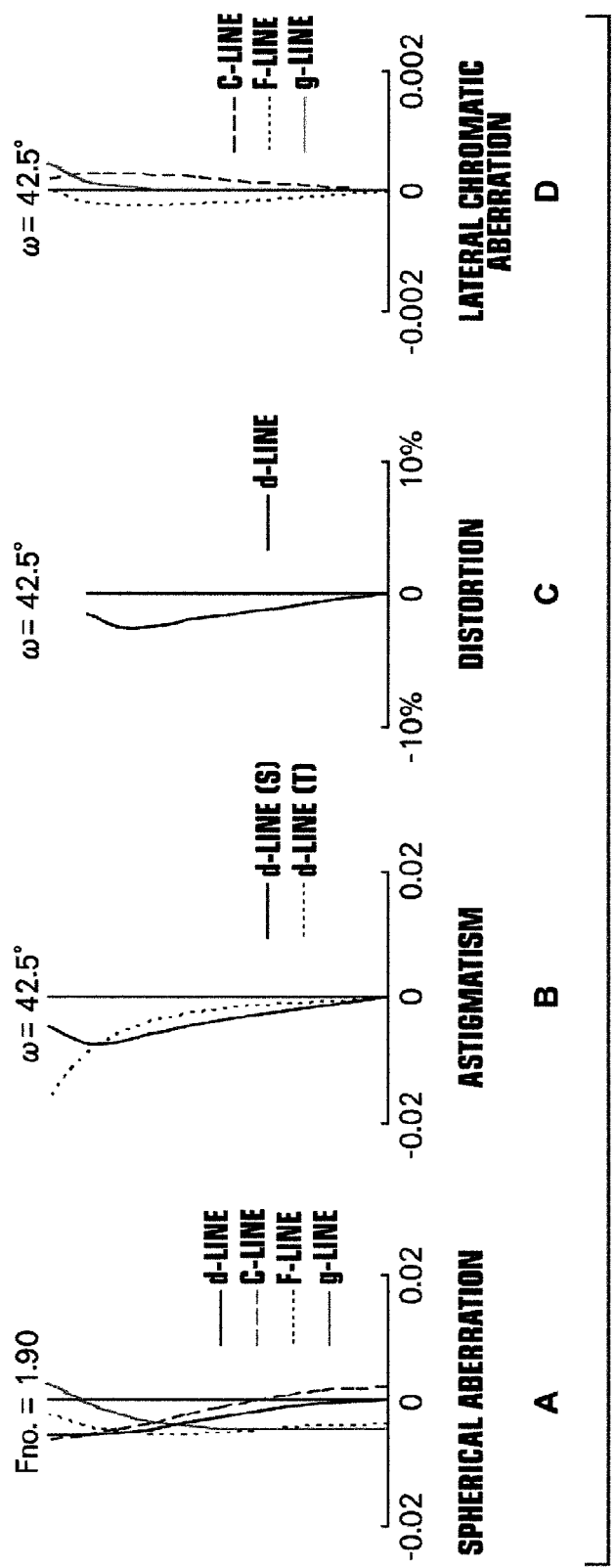
FIG. 10 is a diagram illustrating aberrations of the wide angle lens in Example 4 of the present invention Sections A through D.

Table 7 shows basic lens data of the wide angle lens in Example 4, and Table 8 shows data about specification of the wide angle lens in Example 4. FIG. 10, Sections A through D are aberration diagrams of the wide angle lens in Example 4.

TABLE 8

| EXAMPLE 4•SPECIFICATION (d-LINE) | |
| --- | --- |
| f' | 1.00 |
| Bf' | 1.84 |
| Fno. | 1.90 |
| 2ω [°] | 85.0 |

Next, a wide angle lens in Example 5 will be described. FIG. 6 is a cross section illustrating the lens structure of the wide angle lens in Example 5.

The structure of the wide angle lens in Example 5 is similar to that of Example 4 except that a lens having positive refractive power (biconvex lens L23 in Example 1) is not included between the two cemented lenses in second lens group G2. The absolute value of the curvature radius of the cemented surface of the image-side cemented lens in second lens group G2 is reduced to compensate for the effect of the lens having positive refractive power, especially, the effect of correcting a lateral chromatic aberration.

Figure 11:
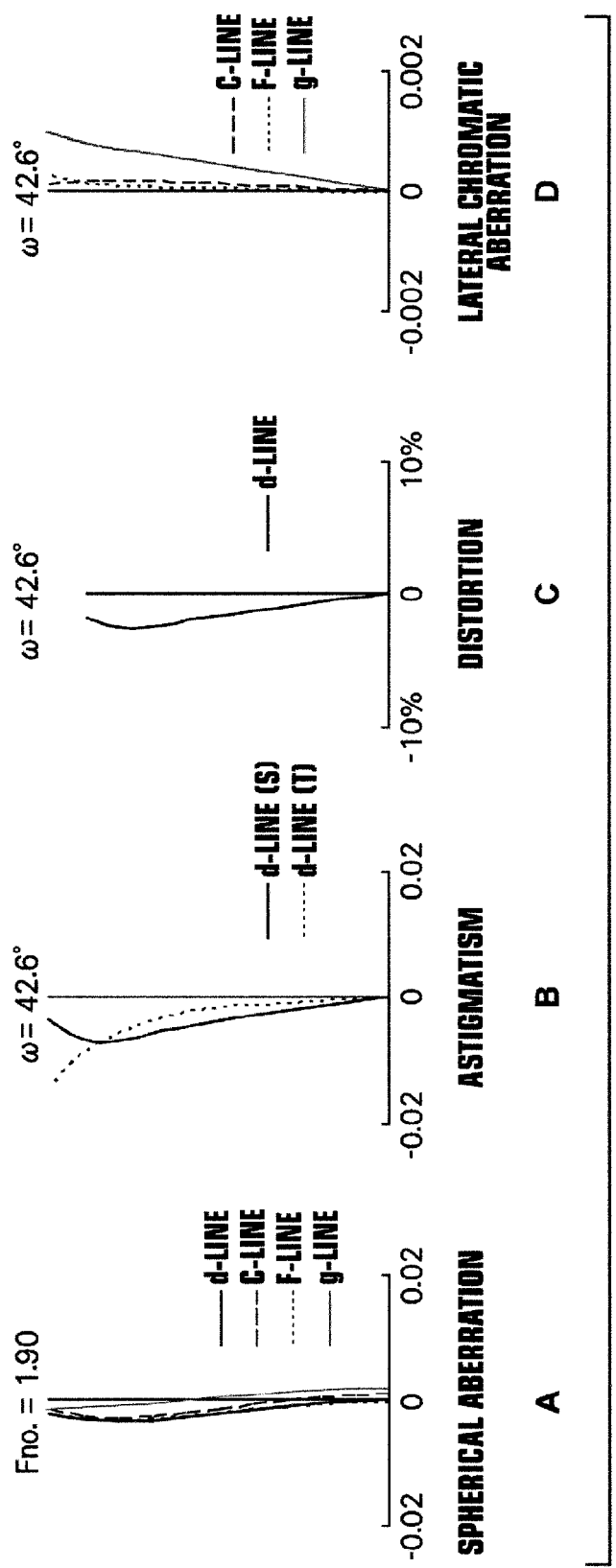
FIG. 11 is a diagram illustrating aberrations of the wide angle lens in Example 5 of the present invention Sections A through D.

Table 9 shows basic lens data of the wide angle lens in Example 5, and Table 10 shows data about specification of the wide angle lens in Example 5. FIG. 11, Sections A through D are aberration diagrams of the wide angle lens in Example 5.

TABLE 7

EXAMPLE 4•LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
| --- | --- | --- | --- | --- | --- |
| 1 | 4.182362 | 0.4276 | 1.77250 | 49.60 | |
| 2 | 10.586104 | 0.0167 | | | |
| 3 | 2.412517 | 0.0833 | 1.61800 | 63.33 | 0.0051 |
| 4 | 1.194020 | 0.5554 | | | |
| 5 | 3.776434 | 0.0833 | 1.80809 | 22.76 | 0.0261 |
| 6 | 1.055180 | 0.4698 | | | |
| 7 | 8.581916 | 0.1611 | 1.49700 | 81.54 | 0.0280 |
| 8 | 2.155460 | 0.6420 | | | |
| 9 | 27.767899 | 0.5554 | 1.80610 | 40.92 | |
| 10 | −0.983390 | 0.0833 | 1.71736 | 29.52 | |
| 11 | −8.928522 | 0.0167 | | | |
| 12 | 38.523524 | 0.2277 | 1.84661 | 23.78 | |
| 13 | −4.432236 | 0.1444 | | | |
| 14 | −2.776790 | 0.0833 | 1.83481 | 42.73 | |
| 15 | 2.109248 | 0.3665 | 1.84139 | 24.56 | |
| 16 | −3.168768 | 0.3432 | | | |
| 17 (STOP) | ∞ | 0.1583 | | | |
| 18 | 1.273911 | 0.1444 | 1.51633 | 64.14 | |
| 19 | 1.666074 | 0.5337 | | | |
| 20 | 3.540642 | 0.1388 | 1.80518 | 25.42 | |
| 21 | 1.139199 | 0.3999 | 1.49700 | 81.54 | |
| 22 | −3.771142 | 0.0167 | | | |
| 23 | 19.186606 | 0.4054 | 1.49700 | 81.54 | |
| 24 | −1.162003 | 0.0833 | 1.80518 | 25.42 | |
| 25 | −3.172618 | 0.1327 | | | |
| 26 | 9.153740 | 0.2999 | 1.72342 | 37.95 | |
| 27 | −3.753557 | 1.3884 | | | |
| 28 | ∞ | 0.1277 | 1.51680 | 64.20 | |
| 29 | ∞ | 0.3654 | | | |

TABLE 9

EXAMPLE 5·LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | ΔθgFj (ANOMALOUS DISPERSION CHARACTERISTICS) |
|---|---|---|---|---|---|
| 1 | 4.266790 | 0.4222 | 1.77250 | 49.60 | |
| 2 | 10.230017 | 0.0167 | | | |
| 3 | 2.427674 | 0.0833 | 1.61800 | 63.33 | 0.0051 |
| 4 | 1.219412 | 0.4488 | | | |
| 5 | 2.804126 | 0.0833 | 1.80809 | 22.76 | 0.0261 |
| 6 | 1.113167 | 0.5405 | | | |
| 7 | 5.301905 | 0.0833 | 1.49700 | 81.54 | 0.0280 |
| 8 | 1.448442 | 0.7905 | | | |
| 9 | 21.620563 | 0.5555 | 1.80610 | 40.92 | |
| 10 | −0.986576 | 0.1444 | 1.72825 | 28.46 | |
| 11 | −9.626014 | 0.3005 | | | |
| 12 | −239.036909 | 0.0944 | 1.80610 | 40.92 | |
| 13 | 1.595095 | 0.4000 | 1.84666 | 23.78 | |
| 14 | −4.443908 | 0.3055 | | | |
| 15 (STOP) | ∞ | 0.2255 | | | |
| 16 | 1.303008 | 0.3055 | 1.48749 | 70.23 | |
| 17 | 1.523723 | 0.4449 | | | |
| 18 | 3.472078 | 0.0833 | 1.80518 | 25.42 | |
| 19 | 1.147274 | 0.4055 | 1.49700 | 81.54 | |
| 20 | −3.773128 | 0.0167 | | | |
| 21 | −7.350230 | 0.3833 | 1.49700 | 81.54 | |
| 22 | −1.099140 | 0.0833 | 1.80518 | 25.42 | |
| 23 | −2.543342 | 0.0167 | | | |
| 24 | 3.670545 | 0.3833 | 1.56883 | 56.36 | |
| 25 | −3.818854 | 1.3887 | | | |
| 26 | ∞ | 0.1278 | 1.51680 | 64.20 | |
| 27 | ∞ | 0.3202 | | | |

TABLE 10

EXAMPLE 5·SPECIFICATION (d-LINE)

| | |
|---|---|
| f | 1.00 |
| Bf | 1.79 |
| Fno. | 1.90 |
| 2ω [°] | 85.2 |

Table 11 shows values corresponding to conditional expressions (1) through (8) about the wide angle lenses in Examples 1 through 5. Here, d-line is a reference wavelength in all of the examples. The following table 11 shows values at this reference wavelength.

TABLE 11

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (1) | ν da | 81.54 | 81.54 | 81.54 | 81.54 | 81.54 |
| (2) | ν db | 22.76 | 22.76 | 22.76 | 22.76 | 22.76 |
| (3) | Δ θ gFb | 0.0261 | 0.0261 | 0.0261 | 0.0261 | 0.0261 |
| (4) | nd(c1p) | 1.80610 | 1.80610 | 1.80610 | 1.80610 | 1.80610 |
| | nd(c1n) | 1.71736 | 1.71736 | 1.71736 | 1.71736 | 1.72825 |
| (5) | ν d(c1p) | 40.92 | 40.92 | 40.92 | 40.92 | 40.92 |
| | ν d(c1n) | 29.52 | 29.52 | 29.52 | 29.52 | 28.46 |
| (6) | nd(c2n) | 1.83481 | 1.83481 | 1.83481 | 1.83481 | 1.80610 |
| | nd(c2p) | 1.84139 | 1.84139 | 1.84139 | 1.84139 | 1.84666 |
| (7) | ν d(c2n) | 42.73 | 42.73 | 42.73 | 42.73 | 40.92 |
| | ν d(c2p) | 24.56 | 24.56 | 24.56 | 24.56 | 23.78 |
| (8) | ν dc | 81.54 | 81.54 | 81.54 | 81.54 | 81.54 |

As the above data show, all of the wide angle lenses in Examples 1 through 5 satisfy conditional expressions (1) through (8). Further, it is recognizable that they are wide angle lenses in which various aberrations are excellently corrected while F-numbers are about 1.9, which means fast lenses, and angles of view are about 85 degrees.

Figure 12:
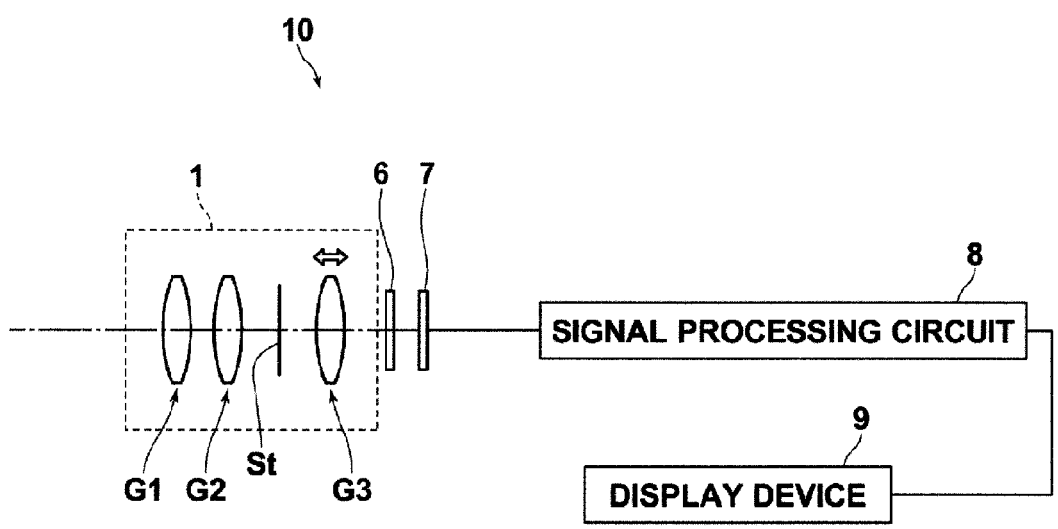
FIG. 12 is a schematic diagram illustrating the configuration of an imaging apparatus according to an embodiment of the present invention.

Next, an imaging apparatus according to an embodiment of the present invention will be described. FIG. 12 is a schematic diagram illustrating the configuration of an imaging apparatus using a wide angle lens according to an embodiment of the present invention, as an example of an imaging apparatus according to an embodiment of the present invention. In FIG. 12, each lens group is schematically illustrated. This imaging apparatus is, for example, a video camera, an electronic still camera or the like using a solid-state imaging device, such as a CCD and a CMOS, as a recording medium.

An imaging apparatus 10, such as a video camera, illustrated in FIG. 12 includes a wide angle lens 1, a filter 6, an imaging device 7 and a signal processing circuit 8. The filter 6 is arranged toward the image side of the wide angle lens 1, and has a function as a low-pass filter or the like, and the imaging device 7 is arranged toward the image side of the filter 6. The imaging device 7 converts an optical image formed by the wide angle lens 1 into electrical signals. For example, a CCD (Charge Coupled Device), a CMOS (Complementary Metal Oxide Semiconductor) and the like may be used as the imaging device 7. The imaging device 7 is arranged in such a manner that an imaging surface of the imaging device 7 and the image plane of the wide angle lens 1 match with each other.

An image imaged by the wide angle lens 1 is formed on an imaging surface of the imaging device 7. Signals about the image are output from the imaging device 7, and operation processing is performed on the output signals at the signal processing circuit 8. Further, an image is displayed on a display device 9.

So far, the present invention has been described by using embodiments and examples. However, the present invention is not limited to the embodiments nor to the examples, and various modifications are possible. For example, values of a curvature radius, a surface distance, a refractive index, an Abbe number and the like of each lens element are not limited to the values in the numerical value examples, but may be other values.

What is claimed is:

1. A wide angle lens consisting of:
a first lens group having negative refractive power, as a whole;
a second lens group having positive refractive power, as a whole; and
a third lens group having positive refractive power, as a whole, in this order from an object side,
wherein a stop is included between the second lens group and the third lens group; and
wherein the first lens group consists of a positive meniscus lens with its convex surface facing the object side and three negative meniscus lenses, each with its convex surface facing the object side, in this order from the object side, and
wherein the second lens group includes at least one cemented lens, and
wherein the material of at least one of the three negative meniscus lenses in the first lens group satisfies the following conditional expression (1), and the material of at least one of the other negative meniscus lenses in the first lens group satisfies the following conditional expressions (2) and (3):

$$\nu da > 81 \quad (1);$$

$$\nu db < 25 \quad (2); \text{ and}$$

$$\Delta\theta gFb > 0.015 \quad (3), \text{ where}$$

νda: an Abbe number of the at least one of the three negative meniscus lenses with respect to d-line,
νdb: an Abbe number of the at least one of the other negative meniscus lenses with respect to d-line, and
ΔθgFb: anomalous dispersion characteristics of the at least one of the other negative meniscus lenses.

2. A wide angle lens, as defined in claim 1, wherein the third lens group consists of a 3a-th lens group consisting of a positive meniscus lens with its convex surface facing the object side and a 3b-th lens group having, as a whole, positive refractive power in this order from the object side.

3. A wide angle lens, as defined in claim 1, wherein the second lens group includes two cemented lenses, and
wherein one of the two cemented lenses consists of a positive lens and a negative lens cemented together in this order from the object side, and the other one of the two cemented lenses consists of a negative lens and a positive lens cemented together in this order from the object side, and
wherein the following conditional expressions are satisfied:

$$nd(c1p) > nd(c1n) \quad (4);$$

$$\nu d(c1p) > \nu d(c1n) \quad (5);$$

$$nd(c2n) < nd(c2p) \quad (6); \text{ and}$$

$$\nu d(c2n) > \nu d(c2p) \quad (7), \text{ where}$$

nd(c1p): a refractive index of the positive lens in the cemented lens consisting of the positive lens and the negative lens in this order from the object side for d-line,
nd(c1n): a refractive index of the negative lens in the cemented lens consisting of the positive lens and the negative lens in this order from the object side for d-line,
νd(c1p): an Abbe number of the positive lens in the cemented lens consisting of the positive lens and the negative lens in this order from the object side with respect to d-line,
νd(c1n): an Abbe number of the negative lens in the cemented lens consisting of the positive lens and the negative lens in this order from the object side with respect to d-line,
nd(c2p): a refractive index of the positive lens in the cemented lens consisting of the negative lens and the positive lens in this order from the object side for d-line,
nd(c2n): a refractive index of the negative lens in the cemented lens consisting of the negative lens and the positive lens in this order from the object side for d-line,
νd(c2p): an Abbe number of the positive lens in the cemented lens consisting of the negative lens and the positive lens in this order from the object side with respect to d-line, and
νd(c2n): an Abbe number of the negative lens in the cemented lens consisting of the negative lens and the positive lens in this order from the object side with respect to d-line.

4. A wide angle lens, as defined in claim 1, wherein the third lens group includes two cemented lenses, each including a convex lens, and all of the convex lenses included in the cemented lenses in the third lens group satisfy the following conditional expression:

$$\nu dc > 81 \quad (8), \text{ where}$$

νdc: an Abbe number of each of all the convex lenses included in the cemented lenses in the third lens group with respect to d-line.

5. A wide angle lens, as defined in claim 2, wherein focusing is performed by moving the 3b-th lens group in the direction of an optical axis.

6. A wide angle lens, as defined in claim 1, wherein the following conditional expression is satisfied:

$$\Delta\theta gFb > 0.025 \quad (3a).$$

7. An imaging apparatus comprising:
the angle lens, as defined in claim 1.

* * * * *